(12) United States Patent
Chen et al.

(10) Patent No.: US 7,117,017 B2
(45) Date of Patent: Oct. 3, 2006

(54) WIRELESS COMMUNICATION SYSTEM WITH BASE STATION BEAM SWEEPING

(75) Inventors: Tao Chen, San Diego, CA (US); Fuyun Ling, San Diego, CA (US); Jack Holtzman, San Diego, CA (US); Yu-Cheun Jou, San Diego, CA (US); Stein A. Lundby, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 10/454,063

(22) Filed: Jun. 3, 2003

(65) Prior Publication Data

US 2003/0195017 A1    Oct. 16, 2003

Related U.S. Application Data

(63) Continuation of application No. 09/409,944, filed on Sep. 30, 1999, now Pat. No. 6,782,277.

(51) Int. Cl.
*H04B 1/38* (2006.01)

(52) U.S. Cl. .................................... 455/562.1; 455/561

(58) Field of Classification Search ............ 455/422.1, 455/436, 450–452.2, 453, 560, 561, 56.21, 455/269, 272, 273, 276.1, 279.1–283, 562.1
See application file for complete search history.

(56) References Cited

U.S. PATENT DOCUMENTS

| | | | | |
|---|---|---|---|---|
| 5,907,816 A | * | 5/1999 | Newman et al. | 455/562.1 |
| 5,966,670 A | * | 10/1999 | Keskitalo et al. | 455/562.1 |
| 6,104,935 A | * | 8/2000 | Smith et al. | 455/562.1 |
| 6,161,023 A | * | 12/2000 | Johnson et al. | 455/562.1 |
| 6,229,481 B1 | * | 5/2001 | Katz | 342/367 |
| 6,233,466 B1 | * | 5/2001 | Wong et al. | 455/562.1 |
| 6,397,082 B1 | * | 5/2002 | Searle | 455/562.1 |

* cited by examiner

*Primary Examiner*—William Trost
*Assistant Examiner*—James D. Ewart
(74) *Attorney, Agent, or Firm*—Philip R. Wadsworth; Thien T. Nguyen; Roberta A. Young

(57) ABSTRACT

A method and apparatus for wireless communications wherein a base station transmits a signal to sending data to a subscriber station through a signal beam that sweeps through the coverage area of the base station. User data addressed to the subscriber station is buffered until the signal beam angle of the signal beam allows efficient transmission. The base station may alter the beam sweep speed or the shape of the beam's radiation pattern over time to maximize system efficiency and capacity.

23 Claims, 12 Drawing Sheets

WIRELESS COMMUNICATION SYSTEM WITH BASE STATION BEAM SWEEPING

CLAIM OF PRIORITY UNDER 35 U.S.C. §120

The present Application for Patent is a Continuation application and claims priority to patent application Ser. No. 09/409,944 entitled "WIRELESS COMMUNICATION SYSTEM WITH BASE STATION BEAM SWEEPING" filed Sep. 30, 1999, now U.S. Pat. No. 6,782,277, and assigned to the assignee hereof and hereby expressly incorporated by reference herein.

BACKGROUND

I. Field of the Invention

The current invention relates to wireless communications. More particularly, the present invention relates to the use of beam sweeping techniques to provide greater capacity in a multi-user wireless communication system.

II. Description of the Related Art

A modern day communication system is required to support a variety of applications. One such communication system is a code division multiple access (CDMA) system which conforms to the "TIA/EIA/IS-95 Mobile Station-Base Station Compatibility Standard for Dual-Mode Wideband Spread Spectrum Cellular System", hereinafter referred to as IS-95. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission", hereafter referred to as cdma2000 and incorporated by reference herein. Methods of transmitting user data (non-voice data) over fundamental and supplemental channels are disclosed in cdma2000.

In a CDMA system, a user communicates with the network through one or more base stations. For example, a user on a subscriber station communicates to a land-based data network by transmitting data on the reverse link to a base station. The base station receives the data and can route the data through a base station controller (BSC) to the land-based data network. The forward link refers to transmission from the base station to a subscriber station and the reverse link refers to transmission from the subscriber station to a base station. In IS-95 systems, the forward link and the reverse link are allocated separate frequencies.

The subscriber station communicates with at least one base station during a communication. CDMA subscriber stations are capable of communicating with multiple base stations simultaneously during soft handoff. Soft handoff is the process of establishing a link with a new base station before breaking the link with the previous base station. Soft handoff minimizes the probability of dropped calls. The method and system for providing a communication with a subscriber station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors which are serviced by the same base station. The process of softer handoff is described in detail in U.S. Pat. No. 5,625,876, entitled "METHOD AND APPARATUS FOR PERFORMING HANDOFF BETWEEN SECTORS OF A COMMON BASE STATION", assigned to the assignee of the present invention and incorporated by reference herein In existing CDMA systems, soft handoffs are established and torn down based on the strength of base station signals received from subscriber stations. In an IS-95 system, for example, subscriber stations measure pilot strength levels for multiple base stations. When the pilot strength level received at a subscriber station from a base station exceeds a threshold T_ADD, that base station is added to the active set of the subscriber station. The base station is removed from the active set of the subscriber station when the strength of the pilot signal received at the subscriber station from that base station falls below a threshold T_DROP. When strength of the same pilot rises again above threshold T_ADD, the base station is re-added to the active set. Backhaul connections between base stations and their respective base station controllers (BSC's) are typically established and torn down in conjunction with these changes in the active set of each subscriber station. The setting up and tearing down of each such backhaul link requires messaging traffic between base stations and the BSC. It is desirable to minimize the backhaul capacity consumed by this messaging traffic. In IS-95, for example, a pilot is not removed from the active set immediately upon its received signal strength dropping below T_DROP. An additional criteria is applied that the strength of a pilot in the active set must remain below T_DROP for longer than a guard time T_TDROP. Adding this guard time requirement decreases the likelihood that a base station is removed from a subscriber station's active set because of spurious signal level fluctuations.

Given the growing demand for wireless data applications, the need for very efficient wireless data communication systems has become increasingly significant. The IS-95 standard is capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In accordance with the IS-95 standard, the traffic data or voice data is partitioned into code channel frames which are 20 msec wide with data rates as high as 14.4 Kbps.

A significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques which require significantly larger delays than those that can be tolerated by voice services can be utilized.

The parameters which measure the quality and effectiveness of a data communication system are the transmission delay required to transfer a data packet and the average throughput rate of the system. Transmission delay does not have the same impact in data communication as it does for voice communication, but it is an important metric for measuring the quality of the data communication system. The average throughput rate is a measure of the efficiency of the data transmission capability of the communication system.

In a CDMA communication system, capacity is maximized when the transmission energy of signals is kept to the minimum value that will satisfy reliability performance requirements. The reliability in reception of a signal depends on the carrier-to-interference ratio (C/I) at the receiver. Thus, it is desirable to provide a transmission power control system that maintains a constant C/I at a receiver. Such a system is described in detail in U.S. Pat. No. 5,056,109 (the '109 patent) entitled "Method and Apparatus for Controlling Transmission Power in a CDMA Cellular Telephone System", assigned to the assignee of the present invention and incorporated by reference herein.

In the '109 patent, a closed loop power control system is described in which the C/I (referred to in the '109 patent as signal to noise ratio) is measured at the receiver and compared to a single threshold value. When the measured C/I exceeds the threshold, a power control command is sent requesting the transmitter to decrease its transmit power. Conversely, when the measured C/I falls lower than the threshold, a power control command is sent requesting the transmitter to increase its transmit power. Because the C/I is not the only factor that determines the reliability of reception of a signal, the '109 patent also describes an outer loop power control system that varies the threshold value in order to satisfy a target reliability.

It is well known that in cellular systems the C/I of any given user is a function of the location of the user within the coverage area. In order to maintain a given level of service, TDMA and FDMA systems resort to frequency reuse techniques, i.e. not all frequency channels and/or time slots are used in each base station. In a CDMA system, the same frequency allocation is reused in every cell of the system, thereby improving the overall efficiency. The C/I that any given user's subscriber station achieves determines the information rate that can be supported for this particular link from the base station to the user's subscriber station. Given the specific modulation and error correction method used for the transmission, which the present invention seeks to optimize for data transmissions, a given level of performance is achieved at a corresponding level of C/I. For idealized cellular system with hexagonal cell layouts and utilizing a common frequency in every cell, the distribution of C/I achieved within the idealized cells can be calculated. An exemplary system for transmitting high rate digital data in a wireless communication system is disclosed in copending U.S. patent application Ser. No. 08/963,386, entitled "METHOD AND APPARATUS FOR HIGHER RATE PACKET DATA TRANSMISSION," (hereafter the '386 application) assigned to the assignee of the present application and incorporated by reference herein.

It is also well known that much of the signal interference in a loaded CDMA system is caused by transmitters belonging to the same CDMA system. In an effort to increase capacity, cells are often divided into sectors or smaller cells operating at lower power, but such methods are costly and difficult to apply in areas having widely varying signal propagation properties. The data communication system of the present invention provides a way of decreasing the mutual interference between elements in the system without requiring a large number of small cells.

SUMMARY OF THE INVENTION

The present invention provides an improved-capacity wireless system by employing beam steering techniques to decrease the required transmit power of base stations and subscriber stations in the system. Instead of relying on a fixed coverage pattern over a coverage area, a base station uses beam steering to transmit and receive signals along a relatively narrow signal beam that "sweeps" through the coverage area of the base station. The sweeping of a signal beam is referred to herein as beam sweeping, and a base station employing beam sweeping techniques is referred to herein as a beam sweeping base station.

Transmitting along a narrow signal beam results in less interference to the majority of subscriber stations in neighboring cells. Receiving along a narrow signal beam mitigates interference otherwise emanating from subscriber stations located outside the signal beam. With much of the interference from other subscriber stations effectively blocked, subscriber stations located within the signal beam can transmit less reverse-link power and achieve the same C/I.

In accordance with an exemplary embodiment of the present invention, base stations create signal beams using mechanically-steered directional antennas. These mechanically-steered antennas are installed instead of or in addition to broad beam antennas such as omnidirectional or approximately 120-degree antennas used for sectorized cells. The mechanically-steered antennas have relatively narrow signal beams that cover a fraction of the base station's coverage area. The antennas are moved over time such that their signal beams "sweep" over the coverage area of the base station.

In an alternate embodiment of the invention, a plurality of broad beam antennas are used to create signal beams instead of a mechanically-steered antenna. The phases of the signals traveling through each of the antennas are adjusted such that they create a signal beam that covers a fraction of the base station's coverage area. By applying a cyclic pattern to the phase shifting of signals for each antenna, a base station "sweeps" its signal beam over its coverage area.

As a base station's signal beam sweeps through the base station's coverage area, the signal beam passes through the portion of the coverage area containing different active subscriber stations. The transmission of user data is delayed so that the data is transmitted while its destination or source subscriber station is within the base station's signal beam. Transmitting within the signal beam requires the least transmit power, and hence, causes the least interference to neighboring cells.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1A:
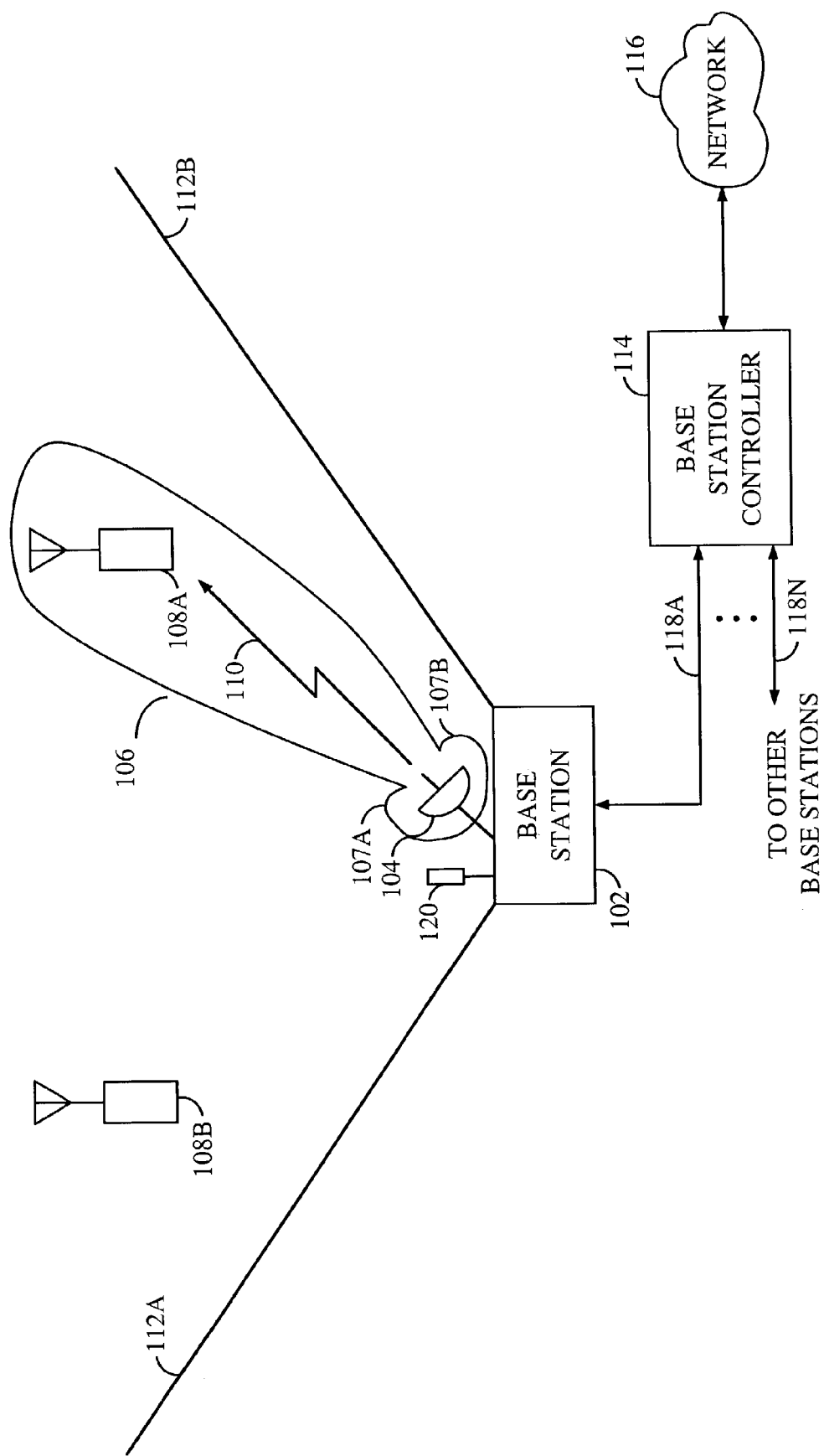
FIG. 1a is a diagram of a communication system including a beam sweeping base station and subscriber stations in accordance with an embodiment of the present invention.

FIG. 1a is a diagram of a communication system used to communicate data between network 116 and subscriber stations 108 through a beam sweeping base station 102. Network 116 is connected to base station controller (BSC) 114, which directs data through base station 102. Though only one base station 102 is shown, the preferred embodiment includes many base stations, each connected to BSC 114 by backhaul 118a. Base station 102 employs beam sweeping techniques, and is referred to herein as a beam sweeping base station. A wireless system configured in accordance with the present invention may utilize exclusively beam sweeping base stations or may comprise a mixture of beam sweeping and non-beam sweeping base stations.

Information received over backhaul 118a includes a combination of voice traffic and user data traffic. Voice traffic is of a nature that it must not be delayed to maximize throughput or for the purposes of error control protocols. User data traffic, however, carries information that is more forgiving of delays. An example of such user data is internet protocol packets already benefiting from error control protocols such as TCP. For these types of packet data traffic, variations in transmission delay are allowed.

Base station 102 transmits and receives signals within a cell sector coverage area between sector boundaries 112 (hereafter referred to simply as coverage area). Base station 102 transmits and receives signals through directional antenna 104 along signal beam 110, which has radiation pattern 106. Directional antenna 104 is mounted on a motor (not shown) inside base station 102, and rotates to change the direction in which signal beam 110 points. Active subscriber stations 108 located within the coverage area receive and decode signals transmitted through directional antenna 104 by base station 102. Subscriber stations 108 are referred to as active when a call or traffic channel exists between the subscriber stations 108 and one or more base stations, such as base station 102 (also called a serving base station).

In an exemplary embodiment, signal beam 110 sweeps in one direction at a generally constant angular speed from sector boundary 112a to sector boundary 112b. Once the beam reaches sector boundary 112b, the beam begins its next sweep beginning at sector boundary 112a.

Subscriber station 108b, though not situated along signal beam 110, may still be able to communicate with base station 102 if the side-lobes 107 of propagation pattern 106 are of sufficient magnitude. In the exemplary embodiment, during the sweeping of signal beam 110, subscriber stations 108 transmit power control commands to base station 102 as necessary to achieve a target carrier-to-interference ratio (C/I). As signal beam 110 sweeps from sector boundary 112a to sector boundary 112b, base station 102 is required to vary its transmit power level to each subscriber station 108 in order to achieve the target C/I.

By correlating the transmit power required by each subscriber station 108 for each signal beam angle, base station 102 can identify a signal beam angle that is optimal for communicating with each subscriber station 108. As signal beam 110 continually sweeps, base station 102 predicts when the signal beam angle will be optimal for efficiently transmitting forward-link supplemental channel traffic to each subscriber station 108. Base station 102 buffers user data addressed to a subscriber station until signal beam 110 reaches the signal beam angle that is optimal for transmitting to that subscriber station. At that time, the user data is transmitted to the destination subscriber station with minimal effect on surrounding cells.

For example, user data addressed to subscriber station 108a, received from network 116 and through BSC 114, is buffered by base station 102 until signal beam 110 is at the optimal angle for transmission to subscriber station 108a. This optimal angle is the angle at which the lowest transmit power can be used while maintaining the target C/I. While signal beam 110 is at this optimal angle, the buffered user data is transmitted to subscriber station 108a in a burst. Multiple supplemental channels are used to transmit this burst if necessary.

In an alternate embodiment, user data addressed to subscriber station 108a is buffered at BSC 114, instead of base station 102. Buffering the user data at BSC 114 allows coordination of user data transmission to a subscriber station lying in a soft handoff region between two or more cells. For example, BSC 114 monitors the transmit power levels required from a first and second base station to achieve the same C/I level at a subscriber station. As each of the two base stations sweeps its signal beam toward the subscriber station, BSC 114 sends user data bursts during both respective optimal beam periods.

In an alternate embodiment, the sweeping velocity of signal beam 110 is increased or decreased as necessary to best accommodate the data traffic loading to and from the subscriber stations in a base station's coverage area. By accelerating or decelerating its beam sweeping, base station 102 adjusts signal beam 110 to spend the most time aimed at areas most densely populated with active subscriber stations. In another alternative embodiment, base station 102 adjusts the velocity of signal beam 110 to spend the most time aimed at areas containing the subscriber stations to which the most user data must be transmitted. In another alternate embodiment in which BSC 114 buffers data addressed to subscriber stations, BSC 114 sends control signals to each base station, for example base station 102, regulating each base stations beam sweeping speed.

Though the directional antenna 104 is shown as a mechanically moving dish-type antenna, one skilled in the art will recognize that other methods may be used to create directional signal beam 110 having radiation pattern 106. For example, signal beams may be created using phased antenna arrays or multiple spatially separated antennas without departing from the present invention.

In an alternate embodiment using a plurality of spatially separated antennas, as described below, a beam sweeping base station transmits a signal through each antenna that is identical except for the phase of the signal. By controlling the phase of the signals transmitted through the antennas, the base station adjusts the portion of the coverage area for which all the transmitted signals are received in-phase with each other. When the signals are received in-phase by a subscriber station in the coverage area, they combine constructively to form a strong combined signal for the subscriber station to demodulate. When the signals are received out-of-phase by a subscriber station in the coverage area, they interfere with each other, decreasing the strength of the combined signal demodulated by the subscriber station.

The same effect can be created for signals received by a base station from a subscriber station in its coverage area. Due to the distance between the receive antennas, the signals received at each antenna arrive at slightly different phases from each other. Phase adjustments to the signals received through each of the receive antennas act to line up the phase of signal components arriving along a propagation path (hereinafter referred to as a receive signal beam). Signals received from directions other than along the receive signal beam tend to combine destructively. For this reason, they cause less interference to the signal received along the receive signal beam. Consequently, the same reverse-link signal reliability can be attained with a lower transmit power level from a subscriber station transmitting along the receive signal beam.

In general, a beam sweeping base station causes less transmission interference to neighboring cells than a base station transmitting through broad beam over its coverage area. In addition, a beam sweeping base station that receives signals from a receive signal beam requires subscriber stations to transmit less power, with the result that the subscriber stations cause less interference to neighboring cells.

When a mechanical means is used to form a signal beam, such as a dish antenna, the signal beam angles of the forward-link and reverse-link signal beams are equal. When using a multiple-antenna beam sweeping apparatus, such as with a phased antenna array, the angles of the signal beams depend on the phase applied to the signals. Because the forward-link and reverse-link carrier frequencies are different, the angles of the respective transmit and receive signal beams may also be different from each other. The difference in transmit and receive signal beam angles will depend on many parameters, such as the types and placement of the antennas, the difference between the forward-link and reverse-link carrier frequencies, and the techniques used to adjust the signal phase through the antennas.

At times, a base station must send broadcast information to all the subscriber stations in its cell coverage area. Since it is unlikely that all the subscriber stations in the cell lie along an identical beam, such broadcast information is preferably transmitted using a broad beam intended to reach all subscriber stations in the base station's coverage area. In a base station using a dish antenna to form signal beams, such broadcast information is transmitted using an additional broad beam antenna 120. In a beam sweeping base station using multiple phase-controlled antennas, however, broad beam coverage can be accomplished without additional antennas. In an exemplary embodiment, broadcast information such as a paging channel is transmitted over a broad transmit beam using just one of the multiple antennas. Access channel information is received over a broad beam by receiving the signals through one or more antennas without using phase shifting (conventional diversity receiving).

One skilled in the art will appreciate that broad beam antenna 120 could be any of a number of types of antenna without departing from the present invention. For example, broad beam antenna 120 could be a colinear array, a dipole antenna, or even a dish antenna having a relatively broad beam.

If base station 102 employs a non-mechanical method of beam sweeping, such as using multiple antennas, the signal beam used to transmit signals to subscriber stations in its cell can be different from the signal beam used to receive signals from subscriber stations. So the beam used to transmit a forward-link signal can be in a different direction, and can sweep at a different speed than the beam used to receive the reverse-link signal.

Figure 1B:
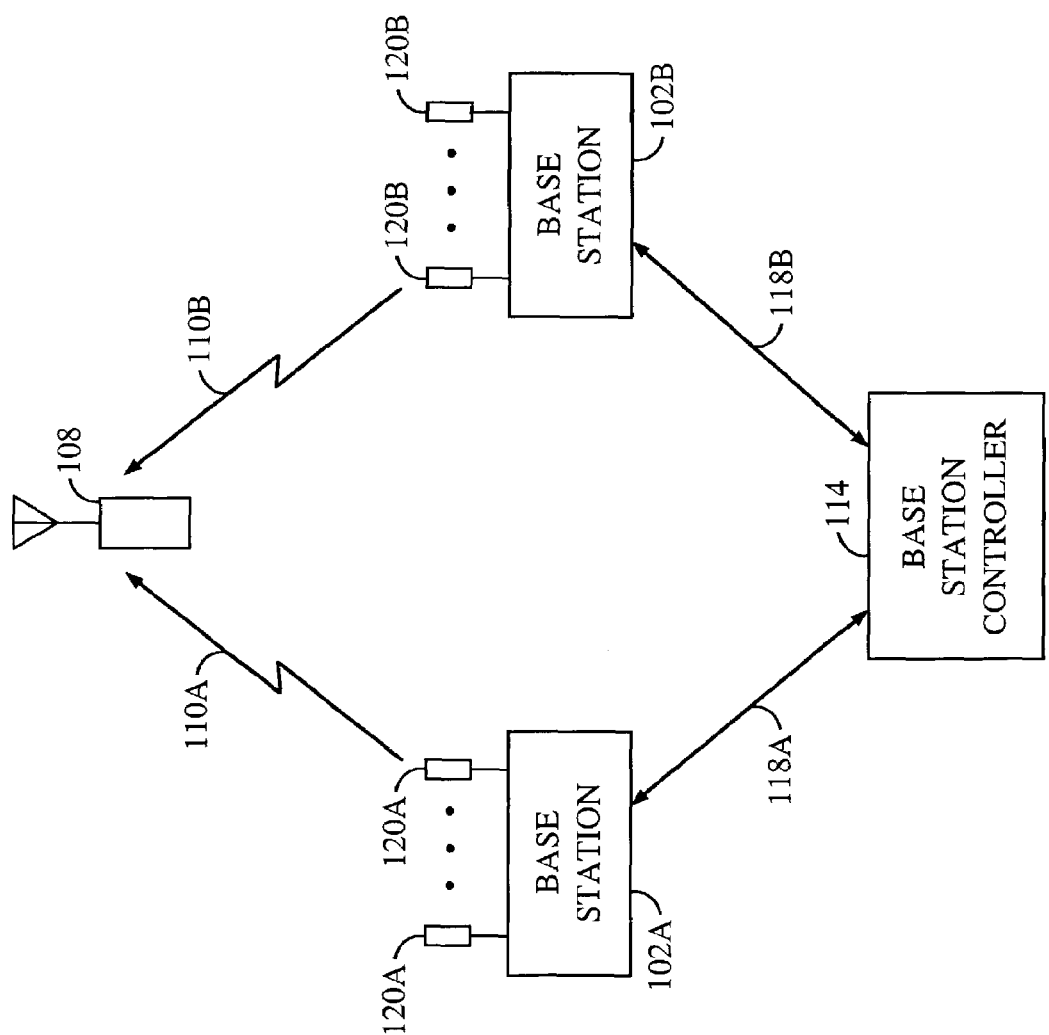
FIG. 1b is a diagram of a communication system including two beam sweeping base stations, each transmitting along its own signal beam to a subscriber station in accordance with an embodiment of the present invention.

FIG. 1*b* is a diagram of a communication system including two beam sweeping base stations 102 transmitting to subscriber station 108. As discussed above, beam sweeping base stations 102 use non-mechanical means to form signal beams 110*a* and 110*b*. By adjusting the relative phase of signals transmitted and received through each of multiple antennas 120, base stations 102 change the angle, and optionally the shape, of the radiation patterns of their respective signal beams 110. As shown, base station 102*a* transmits and receives through multiple antennas 120*a* to form signal beam 110*a*. Base station 102*b* transmits and receives through multiple antennas 120*b* to form signal beam 110*b*.

Each base station 102 is connected to base station controller (BSC) 114 through a backhaul 118. In an alternative embodiment, base stations 102 send power control and signal beam angle information for each subscriber station 108 to BSC 114. BSC 114 uses the information to determine optimal beam angles for each subscriber unit 108 and sends beam sweep speed commands to each base station 102 to vary the rate at which their signal beams sweep through their respective coverage areas. Optimally, the transmission level to or from subscriber station 108 is minimized when both beams are at an optimal angle towards the subscriber station. BSC 114 coordinates the beam sweeping speeds of base stations 108 in order to maximize the capacity and throughput of the network as a whole.

One skilled in the art will recognize that the technique of allowing BSC 114 to control the beam sweep speeds of beam sweeping base stations 102 applies equally well to beam sweeping base stations employing mechanically directional antennas such as the dish antennas described in conjunction with FIG. 1. One skilled in the art will also appreciate that a wireless system may employ both beam sweeping base stations using mechanical beam shaping means and beam sweeping base stations using non-mechanical beam shaping means without departing from the present invention.

In an alternative embodiment, beam sweeping base stations 102 further adjust the relative phase shifts of signals transmitted and received through antennas 120 to vary the shape of the radiation patterns of their respective signal beams 110. For example, the radiation patterns may be adjusted to be wider or narrower to accommodate variations in loading in different regions of the base station's coverage area. The shape of the radiation patterns may be controlled locally at each base station 102, or centrally from BSC 114.

In an alternative embodiment, each base station 102 sends power control and signal beam angle and shape information for each subscriber station 108 to BSC 114. BSC 114 uses the information to determine optimal beam shapes to be used by each base station 102 over time. BSC 114 sends commands to each base station 102 to vary the shape of their signal beams over time.

Figure 2A:
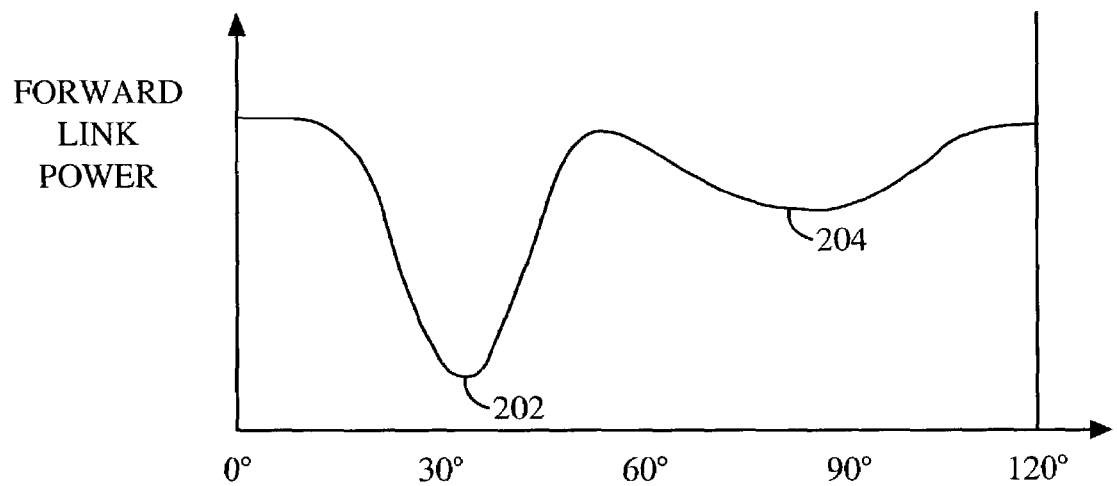
FIG. 2a is a graph of transmit power required to maintain a given level of forward-link signal reliability as a function of the base station's signal beam angle in accordance with an embodiment of the present invention.

FIG. 2a is a graph showing the transmit power required to maintain a given level of signal reliability from base station 102 to subscriber station 108b as a function of the angle of signal beam 110. The required transmit power varies as more or less power is required to maintain a target C/I in relation to the direction of signal beam 110. The x-axis of the graph spans from 0 degrees to 120 degrees, exemplifying the signal beam angle over a 120-degree cell sector. Signal beam 110 is considered to have an angle of 0 degrees when it is aimed roughly parallel with sector boundary 112a, and is considered to have an angle of 120 degrees when it is aimed roughly parallel with sector boundary 112b.

As signal beam 110 sweeps continuously from sector boundary 112a to sector boundary 112b, it passes through an angle where the minimum transmit power is required to maintain the target C/I. The minimum required transmit power 202 shown on the exemplary graph corresponds to a signal beam angle of approximately 35 degrees. As the signal beam 110 continues beyond the angle of optimal C/I for subscriber station 108b, the transmit power from base station 102 rises to a maximum occurring at a signal beam angle of roughly 55 degrees. As the signal beam 110 continues its sweep, mobile station 108b is exposed to a side lobe 107a of the propagation pattern 106 of antenna 104. The resulting decrease in transmit power associated with exposure to the side lobe 107a is shown as another smaller dip 204 in the required transmit power curve.

Figure 2B:
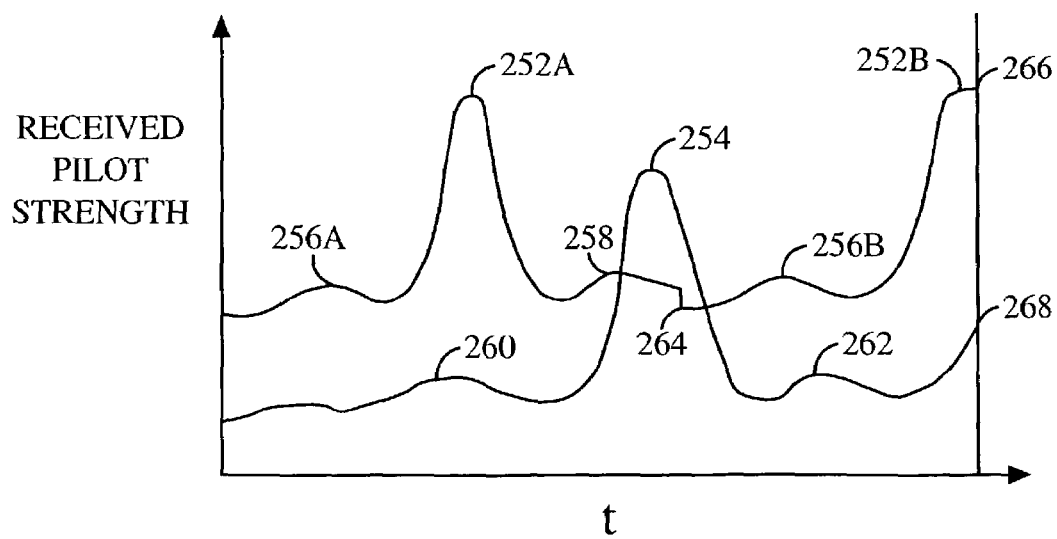
FIG. 2b is a graph of pilot strength measured by a subscriber station located in a soft handoff region between two beam sweeping base stations in accordance with an embodiment of the present invention.

FIG. 2b is an idealized graph showing the pilot strength measured by a subscriber station located in a soft handoff region between two CDMA base stations employing the beam sweeping techniques discussed above. The strength of the pilot signal received from a first base station is shown as curve 266, and the strength of the pilot signal received from the second is shown as curve 268. The x-axis is shown as time, and the beam sweeping patterns of the two base stations are different from each other.

As the beam of the first base station exposes the subscriber station to a first side lobe, the strength of its pilot signal rises to a small peak 256a. As the beam continues its sweep, the beam passes through the optimal signal beam angle for reception at the subscriber station, shown by the large peak 252a. The curve continues on through a second small peak caused by a side lobe 258. A discontinuity in the curve is shown 264 where the signal beam angle from the first base station sweeps into the end of the sector and switches to the other edge of the sector. This discontinuity illustrates what might happen as signal beam 110 of base station 102 sweeps into sector boundary 112b and begins sweeping again from sector boundary 112a. The pilot signal strength of the first base station continues on to repeat the pattern of exposure to a side lobe 256b and another optimal signal beam angle for the subscriber station 252b.

In similar fashion, the pilot signal strength curve 268 of the second base station exhibits side lobe peaks 260 and 262 and an optimal signal beam angle peak 254. In the example shown, the pilot strength associated with the first base station 266 is generally greater than the pilot strength associated with the second base station 268. In the example shown, pilot strength peak 252 associated with the first base station is also greater than pilot strength peak 254 associated with the second base station.

In a wireless system that includes a base station that uses beam sweeping techniques, the sweeping patterns of the base stations' antennas are regular and predictable. A pilot channel peak 252a associated with a first base station can be relied upon to occur again after a beam sweep period. If this beam sweep period is longer than T_TDROP, then conventional soft handoff techniques would remove the first base station from the subscriber station's active set. In addition, conventional soft handoff techniques tear down the base station/BSC backhaul connection corresponding to the subscriber station. When the beam from the first base station sweeps again in the direction of the subscriber station, the first base station's subsequent peak received power level at the subscriber station 252b will rise again above T_ADD. The conventional soft handoff techniques would then re-establish the backhaul connection for the subscriber station between the first base station and the BSC. All this establishing and tearing down of backhaul connections wastes signaling bandwidth between the base station and the BSC. In addition, delays inherent in establishing and tearing down these connections increase the probability of dropped calls. For these reasons, excessive establishing and tearing down of backhaul connections is undesirable.

In an exemplary embodiment of the present invention, knowledge of a base station's 102 sweeping patterns are utilized to prevent unnecessarily tearing down a backhaul connection to the BSC 114 only to re-establish it moments later. When the pilot strength from a beam-sweeping base station 102 to a subscriber station 108b drops below T_DROP, the base station 102 is removed from the active set of the subscriber station 108b. Instead of tearing down the corresponding backhaul connection, however, base station 102 and BSC 114 leave it intact, anticipating that the pilot strength will soon rise back above T_ADD. In an alternative embodiment, the handoff and backhaul connections are preserved by increasing T_TDROP or by decreasing T_DROP.

In some cases, two subscriber stations 108 may be situated within a beam sweeping base station's 102 coverage area such that the base station 102 is never in the active sets of both subscriber stations 108 at the same time. In other words, whenever the signal beam angle is such that base station 102 is in the active set of subscriber station 108a, base station 102 is not in the active set of subscriber station 108b. Alternatively, whenever the signal beam angle is such that base station 102 is in the active set of subscriber station 108b, base station 102 is not in the active set of subscriber station 108a. When this situation occurs, base station 102 may reuse the same Walsh channel for transmissions to either subscriber station 108.

Alternatively, when base station 102 is in the active set of subscriber station 108a, the C/I of the signal from base station 102 measured at subscriber station 108a may be insufficient for any reliable reception. When this happens, base station 108 may reuse the same Walsh channel to transmit to a subscriber station 108b having a much higher C/I. In other words, base station 102 may be in the active sets of both subscriber stations 108 simultaneously and be using the same Walsh channel for both, but transmitting to only one subscriber station 108 at a time. The destination subscriber station is chosen based on which measures the higher C/I.

Figure 3A:
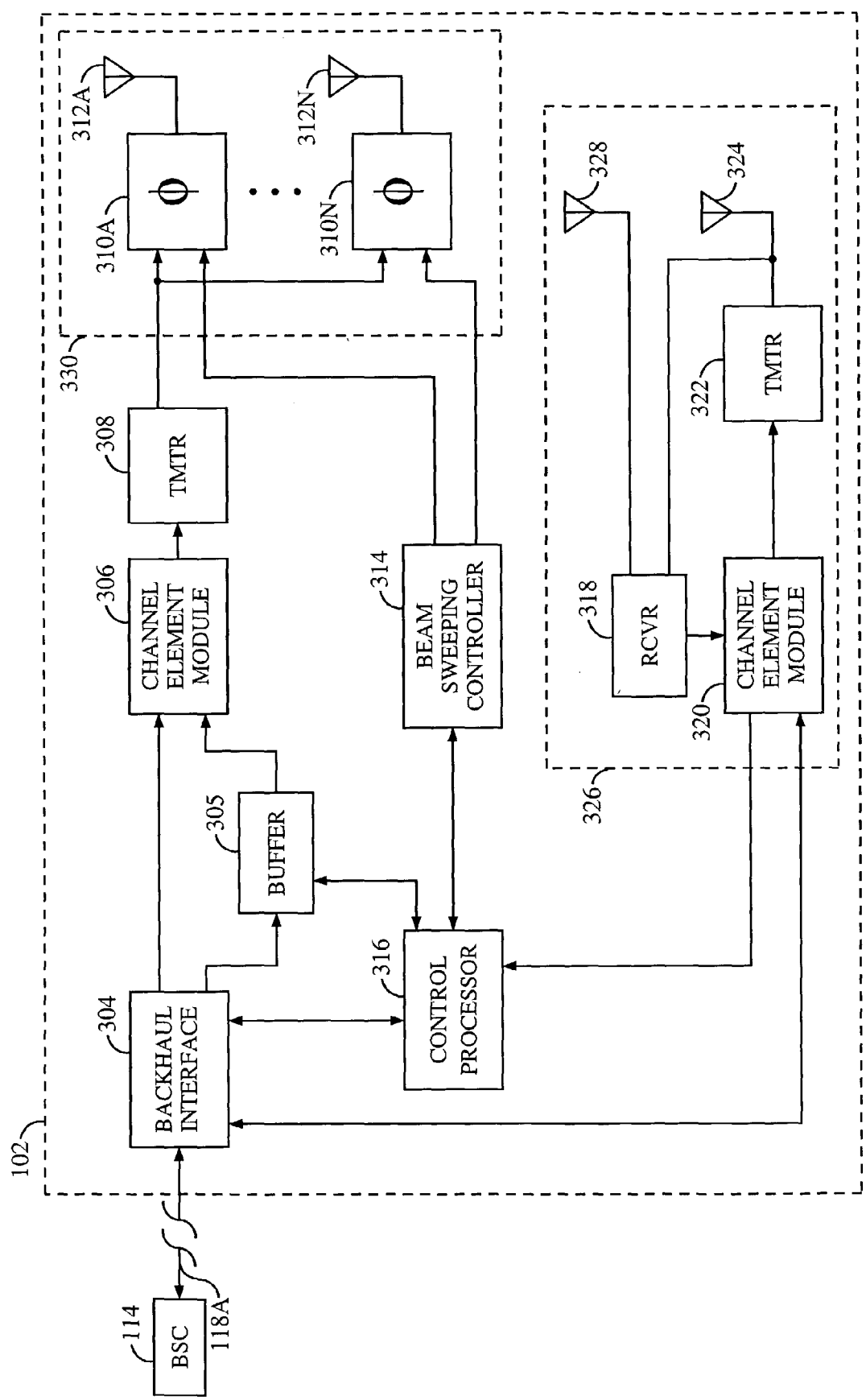
FIG. 3a is a block diagram of a wireless communication apparatus including a beam sweeping base station that uses a plurality of antennas to shape a transmit signal beam in accordance with an embodiment of the present invention.

FIG. 3a is a block diagram of a wireless communication system apparatus including a beam sweeping base station transmitting through a plurality of antennas in accordance with an embodiment of the present invention, wherein beam sweeping is accomplished by varying the phase of signals passing through multiple antennas. Base station controller (BSC) 114 provides traffic signals addressed to a subscriber station to base station 102 over a backhaul connection 118a, where it is received by backhaul interface 304.

Backhaul interface 304 multiplexes the different types of data received from BSC 114 and delivers them to different modules and processors within base station 102. For example, backhaul interface 304 provides voice traffic destined to a subscriber station immediately to channel element module 306 to be modulated and transmitted through transmitter 308. Backhaul interface 304 delivers user data traffic to buffer 305, which holds the user data until directed by control processor 316 to release it to channel element module 306. Channel element module 306 generates modulated signals that are upconverted and amplified in transmitter 308. Transmitter 308 then transmits the amplified signal through signal beam shaping means 330.

In the exemplary embodiment, signal beam shaping means 330 comprises a plurality of phase shifters 310. Each phase shifter shifts the phase of the signals received from transmitter 308 before transmitting it through an antenna 312. The magnitude of the phase shift provided by each phase shifter 310 is based on a control signal from beam sweeping controller 314.

Beam sweeping controller 314 controls the angle of the signal beam transmitted through antennas 312 by controlling the amount of phase shifting that occurs at each phase shifter 310. Beam sweeping controller 314 sends control signals to each phase shifter 310 in order to vary the angle of the transmit signal beam over time as described above. The rate at which beam sweeping controller 314 varies the direction of the signal beam is based on control signals received from control processor 316.

One skilled in the art will appreciate that beam shaping can be accomplished in several alternative ways without departing from the present invention. Also, multiple antennas 312 may be arranged in a variety of configurations, such as perpendicular to a plane or lying along a cylinder, without departing from the present invention.

One advantage of using multiple antennas instead of a mechanically directional antenna is that broadcast communication apparatus 326 may use one of the beam sweeping antennas for broadcast coverage of the cell. For example, antenna 324 is omitted, and antenna 312n is connected to receiver 318 and transmitter 322 as well as to phase shifter 310n.

Another advantage of using multiple antennas is that signal beam radiation pattern 106 can be changed over time. In an exemplary embodiment, beam sweeping controller 314 varies beam radiation pattern 106 by adjusting the phase control signals provided to phase shifters 310. In an alternative embodiment, beam sweeping controller 314 varies beam radiation pattern 106 by changing the number of antennas 312 through which a signal is transmitted. Using fewer antennas 312 results in a wider beam, while using more antennas 312 results in a more narrow beam. Beam sweeping controller 314 varies the number of antennas used for transmission in any of several possible ways. For example, beam sweeping controller 314 sends control signals to each phase shifter 310 indicating a variable level of attenuation to be performed on the transmit signal. Beam sweeping controller 314 effectively eliminates transmission through a subset of antennas 312 by indicating a high level of attenuation to the corresponding subset of phase shifters 310.

In an exemplary embodiment, the above-described techniques are used to adjust the width of radiation pattern 106 according to loading in the coverage area of base station 102. Control processor 316 monitors parameters such as the amount of data stored in buffer 305 and the number of active subscriber stations corresponding to each signal beam angle. Based on the values of these parameters, control processor 316 sends control signals to beam sweeping controller 314, which varies radiation pattern 106 accordingly. For example, the beam is made wider for light traffic regions of the coverage area, and made more narrow when sweeping through heavy traffic regions (regions having many active subscriber units or to which a large amount of data is to be transmitted).

In addition to apparatus necessary to communicate along a signal beam, the exemplary embodiment shown includes apparatus to provide broad beam coverage of a coverage area. In the exemplary embodiment of the invention shown, backhaul interface 304 also multiplexes some types of data to a second channel element module 320, which provides a modulated signal to transmitter 322 for transmission through single antenna 324. Transmitting through single antenna 324 provides a non-sweeping broad beam, and results in a signal being essentially broadcast to the coverage area of base station 102. For use in an omnidirectional cell, antenna 324 is an omnidirectional antenna. For use in a sectorized cell, antenna 324 is a roughly 120-degree directional antenna.

In addition to broad beam transmission, reception through a broad beam is supported by connecting antennas 324 and 328 to receiver 318, which provides downconverted signals to channel element module 320 for demodulation. As the signals received through antennas 324 and 328 are not subjected to phase shifting, they provide conventional diversity reception for receiver 318. Such broad beam reception is more appropriate than beam sweeping for such channels as the access channel, as the timing of access channel transmissions is generally governed by subscriber station users and not by signal beam angle. One skilled in the art will recognize that receiver 318 could also use more than two antennas for diversity reception, or could use a single receive antenna 324 without departing from the present invention.

Together, receiver 318, channel element module 320, transmitter 322 and antenna 324 make up a broadcast communication apparatus 326. Among the types of channels which are transmitted and received through the broadcast communication apparatus 326 are paging and access channels. In an alternative embodiment of the invention, voice traffic is sent using the broadcast communication apparatus, and only user data traffic is sent using the beam-sweeping apparatus.

Channel element module 320 also decodes power control commands from the signal received from each active subscriber station in a cell and sends them to control processor 316. Control processor 316 uses the power control information to determine the optimal signal beam angle corresponding to each active subscriber station. Control processor 316 then uses the information to control the speed of the beam sweeping by sending control signals to beam sweeping controller 314. As discussed above, the sweeping of signal beam 110 is sped up or slowed down as necessary to best accommodate the user data traffic loading to and from the subscriber stations in a base station's cell.

In an alternate embodiment, beam sweeping controller 314 operates independently of control processor 316. In the alternate embodiment, beam sweeping controller 314 sweeps the signal beam from one edge of a cell 112a to the other edge 112b at a generally constant speed. Control processor 316 analyzes the timing of power control commands received form subscriber stations in order to predict the recurring pattern of optimal transmission periods associated with each active subscriber station.

In another alternative embodiment, beam sweeping controller 314 is connected to control processor 316, but does not receive commands from control processor 316. Beam sweeping controller 314 only sends the current signal beam angle to control processor 316 for use in analyzing the optimal transmission periods of active subscriber stations.

As the signal beam 110 of base station 114 sweeps through its coverage area, it passes through the angles for which information can be most efficiently transmitted to and from individual active subscriber stations 108. Control processor 316 sends control signals to buffer 305 directing it to hold user data for each subscriber station until the beam approaches the optimal angle for transmission to the subscriber station. When the beam is at or near the optimal angle for a subscriber station, control processor 316 signals buffer 305 to release the user data collected for that subscriber station to channel element module 306. Channel element module 306 then modulates the user data and sends it to transmitter 308. In the preferred embodiment of the invention, channel element module 306 modulates user data from buffer 305 so that it is transmitted to the destination subscriber station using one or more supplemental data channels.

In another alternative embodiment, buffer 305 is located within BSC 114 instead of in each base station 102. Placing buffer 305 in the BSC allows user data to be transmitted from multiple base stations using soft handoff. BSC may transmit through multiple base stations even if only one of the base stations is transmitting through a beam at an optimal angle for the destination subscriber station. In another alternative embodiment, BSC 114 sends beam sweeping speed control commands through backhaul interface 304 to control processor 316. BSC 114 can then coordinate the signal beams of multiple beam sweeping base stations to further improve the data throughput to a destination subscriber station.

Figure 3B:
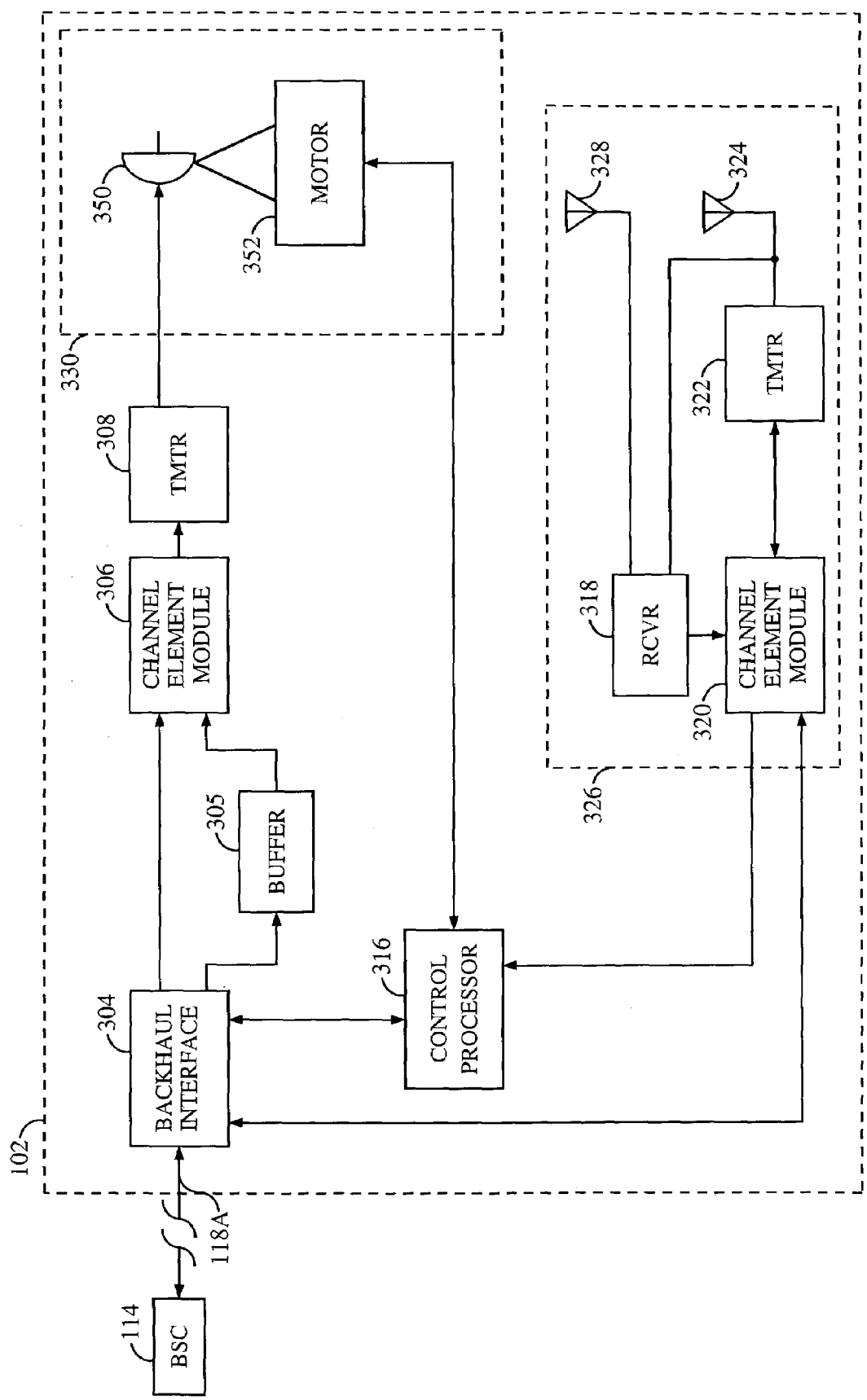
FIG. 3b is a block diagram of a wireless communication apparatus including a beam sweeping base station that uses a directional antenna to shape a transmit signal beam in accordance with an embodiment of the present invention.

FIG. 3b is a block diagram of a wireless communication system apparatus in which signal beam shaping is accomplished with a rotating narrow-beam directional antenna, in accordance with an alternate embodiment. In the alternative embodiment, signal beam shaping means 330 comprises mechanically directional narrow-beam antenna 350, shown as a dish antenna, mounted on rotating motor 352. Motor 352 provides signal beam angle information to control processor 316 to facilitate correlating signal beam angles with power levels of signals transmitted to active subscriber stations. Control processor 316 receives control commands from BSC 114 and accelerates or decelerates the speed of motor 352.

Figure 4A:
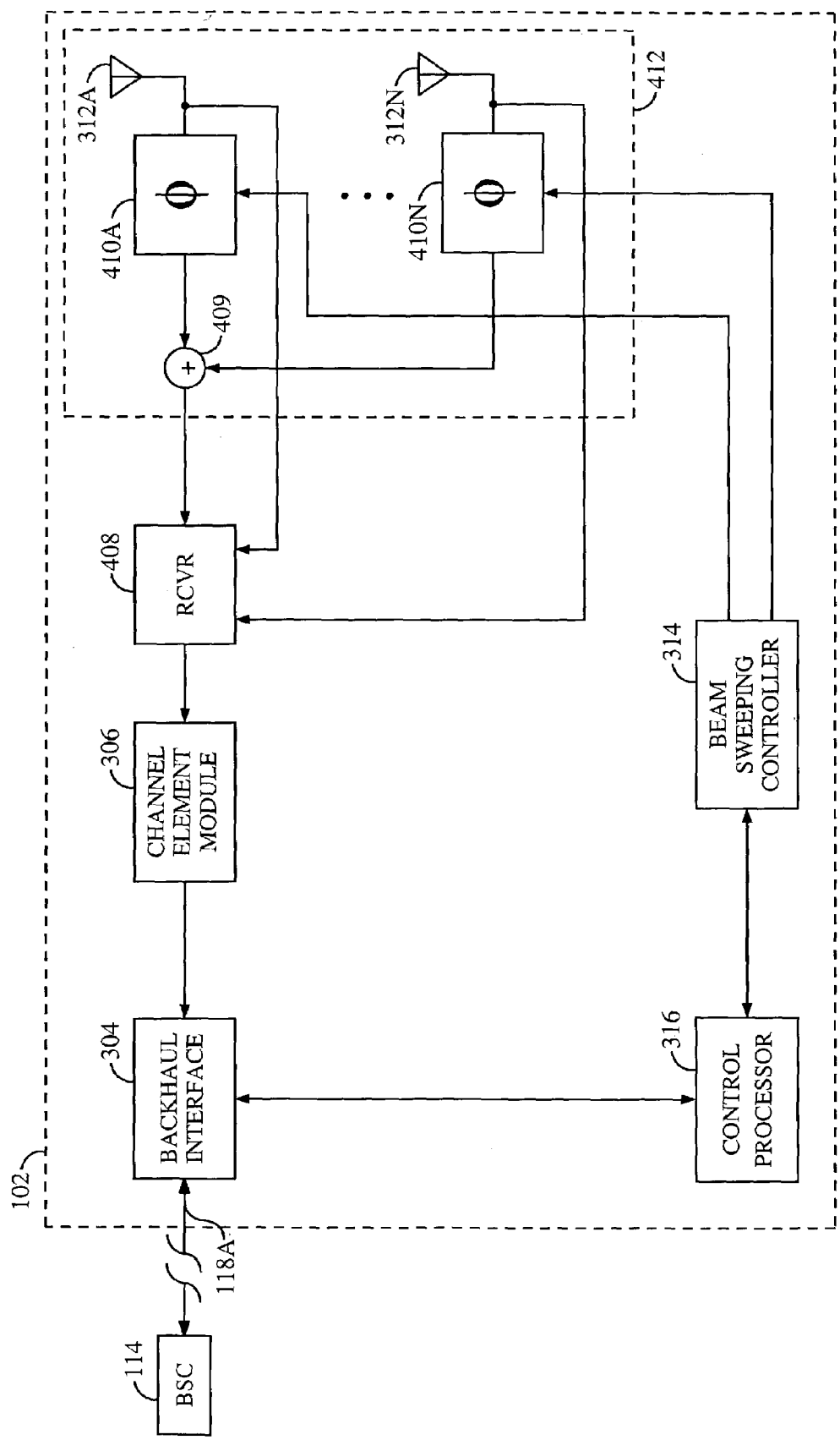
FIG. 4a is a block diagram of a wireless communication apparatus with a beam sweeping base station that uses a plurality of antennas to shape a receive signal beam in accordance with an embodiment of the present invention.

FIG. 4a is a block diagram of a wireless communication system apparatus with a base station 102 that uses multiple receive antennas to shape the receive signal beam in accordance with an embodiment of the present invention. In the embodiment shown, receive beam shaping means 412 comprises phase shifters 410 that alter the phase of signals received through antennas 312. The signals received through phase shifters 410 are summed in signal combiner 409 and provided to receiver 408, which downconverts the combined signal and provides it to channel element module 306. Channel element module 306 demodulates and decodes the received signals and sends the resultant user data through backhaul interface 304 to BSC 114. Beam sweeping controller 314 generates control signals provided to each phase shifter 410 to regulate the amount of phase shifting performed in each phase shifter 410, thus changing the angle of the receive signal beam.

As shown, receiver 408 receives signals from antennas 312 through additional connections that bypass phase shifters 410. These additional connections allow conventional receive signal diversity without receiving through a shaped signal beam. The strength of a subscriber station signal received in this way will be based on the subscriber station's location within the coverage area, and not a signal beam angle. By processing received signals both with and without the use of phase shifters, base station 102 can utilize both beam sweeping techniques and broadcast communication techniques as appropriate for different channels. For example, this kind of "broadcast" receive coverage is more appropriate for signals such as access channel signals received from non-active subscriber stations.

As discussed above, beam sweeping controller 314 may sweep the receive beam at a constant speed independent of command from control processor 316, or may be directed to accelerate or decelerate beam sweeping by a control signal received from control processor 316. In addition, control processor 316 may receive beam sweep speed commands from BSC 114 through backhaul interface 304.

As discussed in terms of the forward-link, beam sweeping controller 314 can vary beam radiation pattern 106 for the reverse-link by adjusting the phase control signals provided to phase shifters 410. In an exemplary embodiment, beam sweeping controller 314 varies beam radiation pattern 106 by changing the number of antennas 312 through which a signal is received. Using fewer antennas 312 results in a wider beam, while using more antennas 312 results in a narrower beam. Beam sweeping controller 314 varies the number of antennas used for transmission in any of several possible ways. For example, beam sweeping controller 314 sends control signals to each phase shifter 410 indicating a variable level of attenuation to be performed on the received signal. Beam sweeping controller 314 effectively eliminates transmission through a subset of antennas 312 by indicating a high level of attenuation to the corresponding subset of phase shifters 310.

In an exemplary embodiment, the above-described techniques are used to adjust the width of radiation pattern 106 on the reverse-link according to the density of active subscriber station in different regions of the coverage area of base station 102. Control processor 316 monitors the number of active subscriber stations corresponding to each signal beam angle. Based on the values of these parameters, control processor 316 sends control signals to beam sweeping controller 314, which varies reverse-link radiation pattern 106 accordingly. For example, the beam is made wider for sparsely populated regions of the coverage area, and made more narrow when sweeping through densely populated regions (regions having many active subscriber units).

Figure 4B:
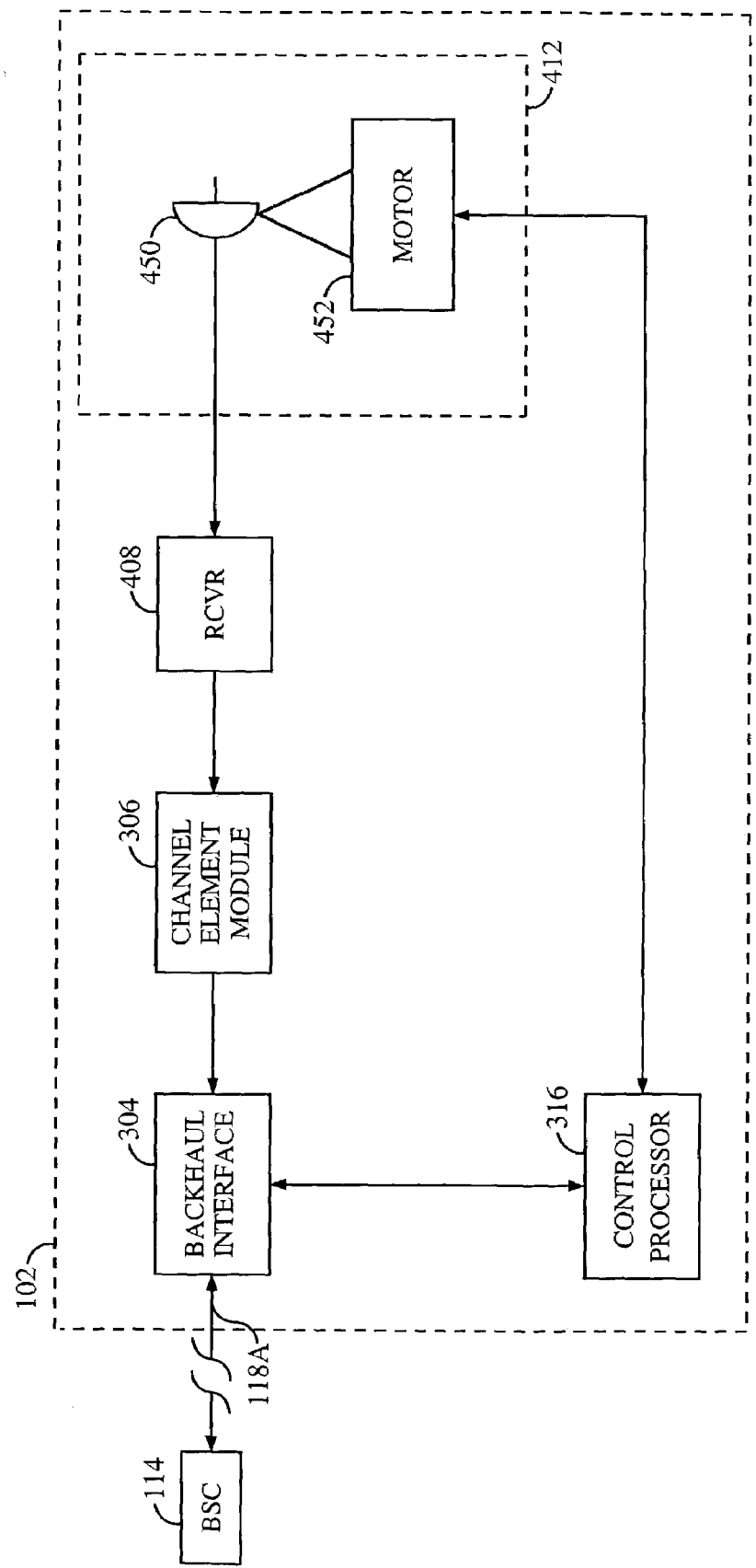
FIG. 4b is a block diagram of a wireless communication apparatus with a beam sweeping base station that uses a directional antenna to shape a receive signal beam in accordance with an embodiment of the present invention.

FIG. 4b is a block diagram of a wireless communication system apparatus with a beam sweeping base station that shapes its reverse-link signal beam using a mechanically aimed directional antenna 450. In the embodiment shown, receive beam shaping means 412 comprises directional antenna 450 mounted on motor 452, which sweeps the receive signal beam across the coverage area of base station 102. The signals received through directional antenna 450 are provided to receiver 408, which downconverts the combined signal and provides it to channel element module 306. Channel element module 306 demodulates and decodes the received signals and sends the resultant user data through backhaul interface 304 to BSC 114. Control processor 316 receives sweep speed commands from BSC 114 through backhaul interface 304 and accelerates or decelerates the sweep rate of motor 452 accordingly.

Directional antenna 450 is shown as a dish type antenna, although one skilled in the art will recognize that other mechanically aimed beam shaping devices may alternatively be used without departing from the current invention. One result of using such a mechanical method of beam shaping is that the forward link signal beam has the same angle as the reverse link signal beam.

In the apparatus figures discussed above, the receivers and transmitters are described as being connected directly to antennas. Where both a receiver and a transmitter operating at different frequencies share a common antenna, an RF diplexer may be placed between the receiver, a transmitter, and antenna without departing from the present invention.

Figure 5:
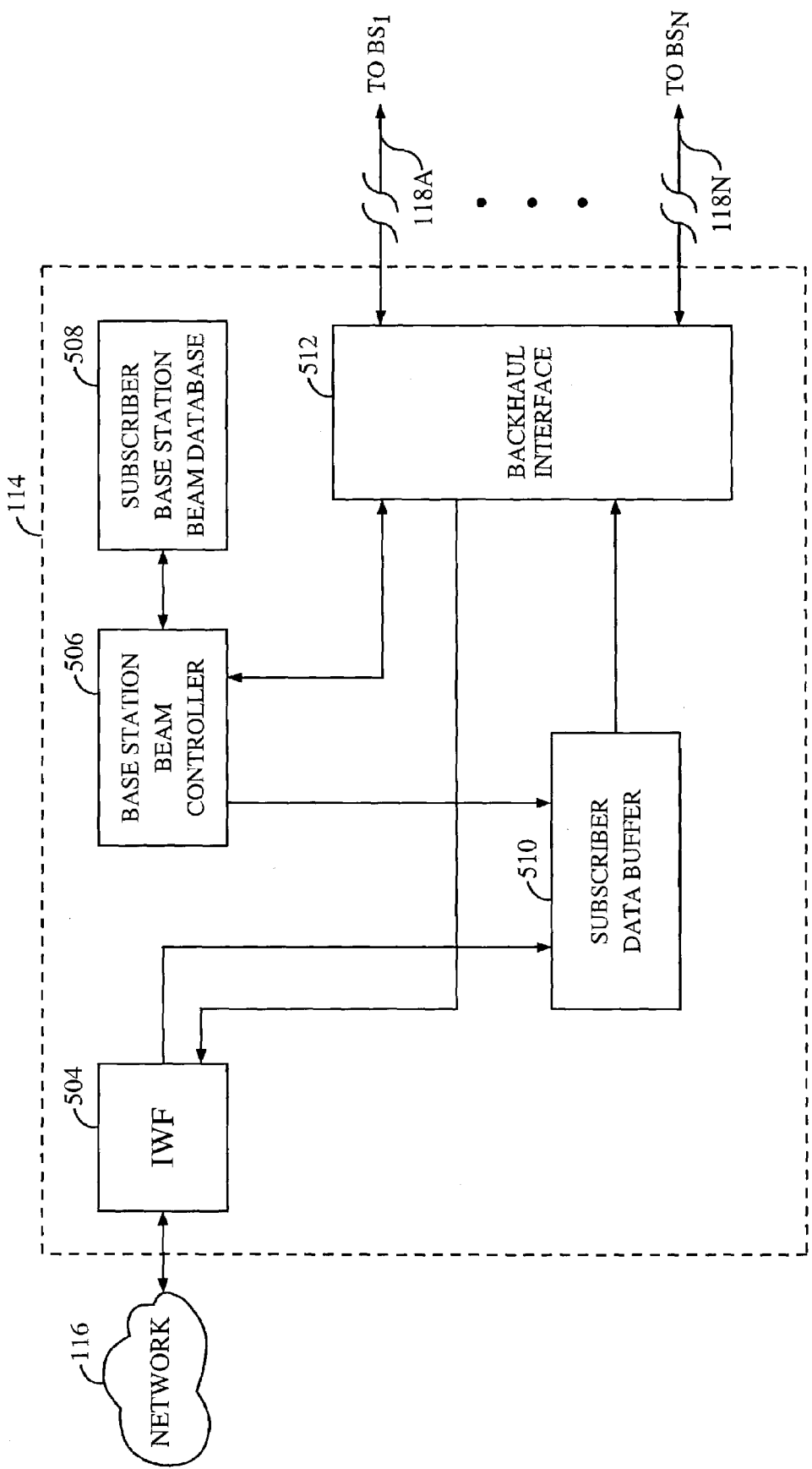
FIG. 5 is a block diagram of a base station controller apparatus configured in accordance with an embodiment of the present invention.

FIG. 5 is a block diagram of a wireless communication system base station controller apparatus configured in accordance with an embodiment of the present invention. Through BSC 114 and base stations connected to it by backhauls 118, multiple subscriber stations exchange user data with network 116.

Inter-working function (IWF) 504 acts as the interface between network 116 and the rest of BSC 114. IWF 504 converts network data to a format appropriate for transport in a wireless communication system. Data from IWF 504 that is addressed to a subscriber station is stored in subscriber data buffer 510. Subscriber data buffer 510 accumulates the user data until directed by base station beam controller 506 to release the user data to backhaul interface 512, where it travels to corresponding base stations through backhauls 118.

Base station beam controller 506 receives power control and beam sweep information corresponding to each active subscriber station and base station in its wireless network. Base station beam controller 506 correlates forward power levels to signal beam angles or beam sweep timing for each active subscriber station-beam sweeping base station pair. The correlated data is stored into subscriber base station beam database 508. From the data stored in this database, base station beam controller 506 identifies the optimal signal beam angles or beam sweep times for each active subscriber station. Using this information, base station beam controller 506 generates predictions of optimal throughput windows for each subscriber station.

Several different types of information may be used by base station beam controller 506 to form these estimates without departing from the present invention. Base station beam controller 506 may use the transmit power levels corresponding to a target C/I as discussed above. Or, base station beam controller 506 may use fast power control up and down power commands punctured into the reverse-link signal. Or, base station beam controller 506 may use a combination of these types of signals. Base station beam controller 506 may receive signal beam angle information from the beam sweeping controller 318 in each base station or may track the power control fluctuations over the known beam sweeping periods.

In an alternate embodiment, base station beam controller 506 generates beam sweeping speed control commands sent to beam sweeping controllers 314 in each beam sweeping base station 102. Base station beam controller 506 uses these commands to increase beam coverage of cell regions with a high density of subscriber stations. Increased beam coverage is also provided to cell regions having few subscriber stations but large amounts of user data to be exchanged. Generally, it is desirable for base station beam controller 506 to use beam sweeping speed control commands to maximize overall user data throughput to all subscriber stations served by BSC 114.

In another alternate embodiment, base station beam controller 506 generates beam radiation pattern control commands sent to beam sweeping controllers 314 in each beam sweeping base station 102. Base station beam controller 506 uses these commands to adjust radiation pattern 106 according to these commands to afford better beam coverage to selected cell regions, according to density of active subscriber stations or the amounts of user data to be exchanged in the selected regions.

One skilled in the art will recognize that beam sweeping controller 314 and base station beam controller 506 may be implemented using field-programmable gate arrays (FPGA), programmable logic devices (PLD), digital signal processors (DSP), microprocessors, application specific integrated circuit (ASIC) or other device capable of interpreting and generating the required signals and commands of those controllers. One skilled in the art will appreciate that this does not preclude implementing beam sweeping controller 314 or base station beam controller 506 inside another processor or controller present in the respective base station 102 or BSC 114 in the wireless system.

Digital gain blocks 106 may be implemented using field-programmable gate arrays (FPGA), programmable logic devices (PLD), digital signal processors (DSP), application specific integrated circuit (ASIC) or other device capable of performing the required digital processing in response to signals from a controller such as control module 116. One skilled in the art will appreciate that this does not preclude implementing control module 116 inside one of the digital gain blocks 106. One skilled in the art will also appreciate that digital gain block 106 could also be placed before mixer 102, between phase-controlled oscillator 104 and mixer 102, or even built into phase-controlled oscillator 104 without departing from the present invention.

Figure 6:
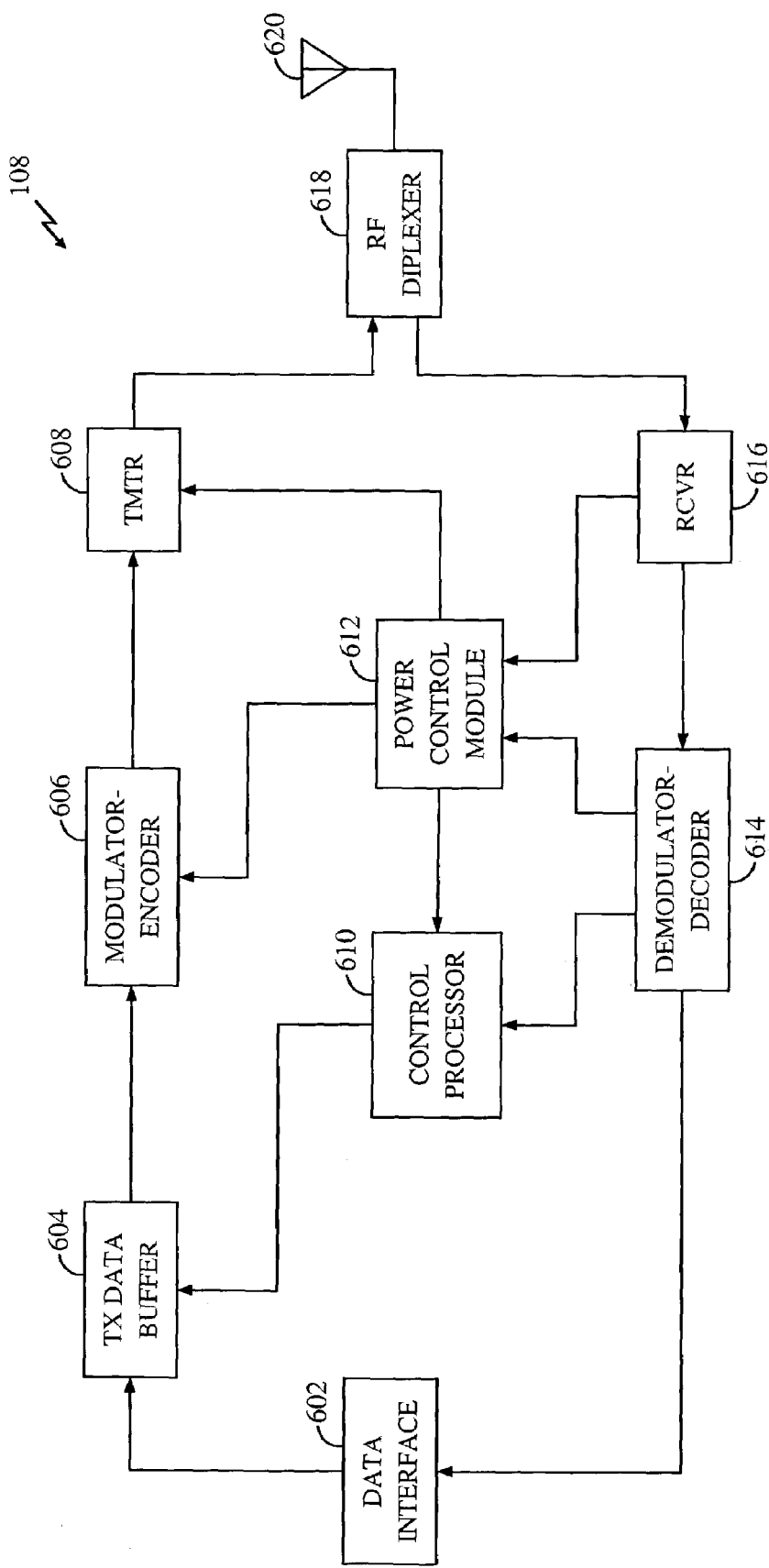
FIG. 6 is a block diagram of a subscriber station apparatus configured in accordance with an embodiment of the invention.

FIG. 6 is a block diagram of a subscriber station apparatus configured in accordance with an embodiment of the invention. The subscriber station 108 regulates its reverse-link data rate such that the user data is transmitted during periods when serving base stations can most efficiently receive the subscriber station's reverse-link signal. For a given beam sweeping base station, these periods generally coincide with an optimal signal beam angle within that base station's beam sweeping range. Optimizing reverse link power in this way provides an increase in reverse link capacity, because subscriber stations transmitting at lower power levels cause less interference to each other.

In an exemplary embodiment of the invention, a forward-link signal is received through antenna 620 and passes through RF diplexer 618. Forward-link signals are gain-controlled and downconverted in receiver 616, which provides the resulting downconverted signal to demodulator-decoder 614. User data, such as packet data demodulated by demodulator 614, is provided to data interface 602.

In the reverse direction, data interface 602 provides user data such as packet data to transmit data buffer 604. Transmit data buffer 604 stores the user data until it can be efficiently transmitted to a base station 102 serving the subscriber station 108 (also called a serving base station). At an appropriate time, transmit data buffer 604 provides user data to modulator-encoder 606, which modulates the user data for transmission. Modulator-encoder 606 then provides the modulated user data to transmitter 608, which upconverts and amplifies the signal. The upconverted and amplified signal is then provided to RF diplexer 618 and transmitted through antenna 620. Diplexer allows transmitter 608 and receiver 616 to use the same antenna 620 without interfering with each other.

Power control module 612 performs power control for both the forward and reverse links. Receiver 616 measures received signal strength and provides the information to power control module 612. Demodulator-decoder decodes power control information received from serving base stations and provides the information to power control module 612. The decoded power control information can include reverse-link power control thresholds, up/down power control commands punctured into the forward link signal, and statistical frame error rate and erasure information. The signal strength and power control information is used by power control module 612 to generate a threshold ratio between received power level and transmit power level. Power control module 612 then uses this information to regulate the reverse-link power level of signals transmitted from transmitter 608.

In the preferred embodiment of the invention, power control module 612 further monitors signal-to-noise ratios of the received forward-link signal and sends power control signals to the serving base stations through modulator-encoder 606. These signals may be in the form of signaling messages, but are preferably up/down commands punctured into the reverse-link signal. In an alternate embodiment of the invention, each subscriber station 108 sends multiple-bit power control commands, specifying forward-link power adjustments corresponding to specific base stations in the subscriber station's active set. In another alternate embodiment, subscriber station 108 sends multiple-bit power commands conveying the signal strengths estimated by subscriber station 108 for signals received from specific base stations.

Power control module 612 provides a signal to control processor 610 based on the reverse link power level. When subscriber station 108 is being served by one or more beam sweeping base stations 102, the transmit power of subscriber station 108 will be affected by the beam sweeping patterns of the serving base stations. As the signal beam of base station 102 sweeps into an angle that provides efficient reception of a reverse-link signal from subscriber station 108, the power control mechanisms described above cause the transmit power of subscriber station 108 to decrease. As the signal beam sweeps away from the optimal angle for subscriber station 108, the power control mechanisms described above cause the transmit power of subscriber station 108 to increase.

Power control module 612 provides transmit power levels sent to transmitter 608 to control processor 610. Control processor 610 controls the rates of release of reverse-link user data from transmit data buffer 604 based on transmit power levels. Control processor 610 uses information from power control module 612 to predict periods when user data can most efficiently be transmitted from subscriber station 108 to serving base stations. These periods generally correspond to the periods when beam sweeping base station 102 is receiving along a signal beam pointed toward subscriber station 108.

In the preferred embodiment of the invention, base station 102 and subscriber station 108 use CDMA techniques to transmit multiple signals to each other. The multiple signals transmitted on the forward-link and reverse-link include fundamental channels and supplemental channels. Whenever a subscriber station is exchanging data with a base station, both must use a fundamental channel, which is bidirectional. When a higher data rate is required in either the forward or reverse direction, one or more unidirectional supplemental channels are established in the required direction.

In the preferred embodiment, transmit data buffer 604 is used to buffer user data even when no reverse link supplemental channels have been established. For example, on a reverse link fundamental channel where the rate of user data received from data interface 602 is less than the fundamental channel capacity, the fundamental channel data rate is varied to maximize efficiency. In other words, when the signal beam of base station 102 is pointing at subscriber station 108, subscriber station 108 allows transmission of user data from transmit data buffer 604 in full-rate frames. When the signal beam of base station 102 is pointing away from subscriber station 108, subscriber station 108 transmits user data from transmit data buffer 604 in less-than-full-rate frames. However, if transmitting at lower rates during periods of inefficiency causes an overrun of transmit data buffer 604, subscriber station 108 will transmit continuously at full-rate on the fundamental channel.

Figure 7A:
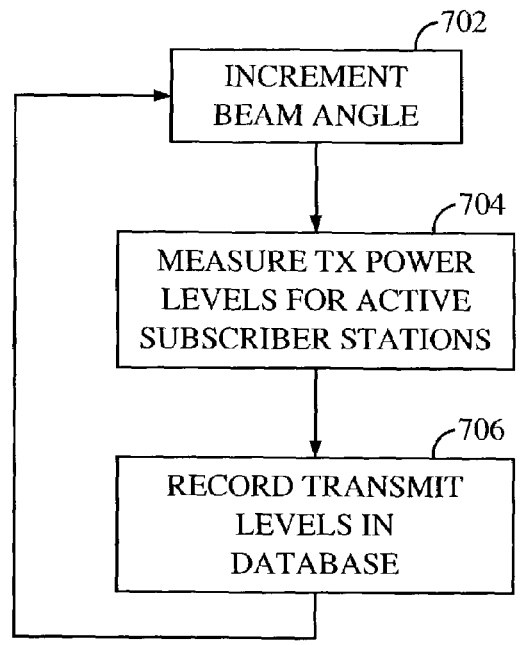
FIG. 7a is a flowchart of a method used to collect information for correlating subscriber stations to signal beam angles in accordance with an embodiment of the invention.

FIG. 7a is a flowchart of a method used to collect information for correlating subscriber stations to signal beam angles in accordance with an embodiment of the invention. The correlation is based on the forward-link power levels required to maintain a target C/I level for each active subscriber station. Alternatively, the use of a target C/I level may be replaced by a target data rate with a specific quality of service. For example, power control can be implemented to provide power levels necessary to support 19,200 bits-per-second (bps) with a 1% frame error rate (FER).

In an exemplary embodiment, this method is used in BSC 114 when filling subscriber base station beam database 508 with information. In an alternate embodiment, this method is used to correlate signal beam angles for subscribers within a single base station, within control processor 316.

Each time the signal beam angle of a base station is incremented 702, the forward-link power level required to maintain a target C/I ratio is measured 704 for each active subscriber station served by the base station. The measured forward-link power levels are stored 706 into a database for correlation by a control processor.

Figure 7B:
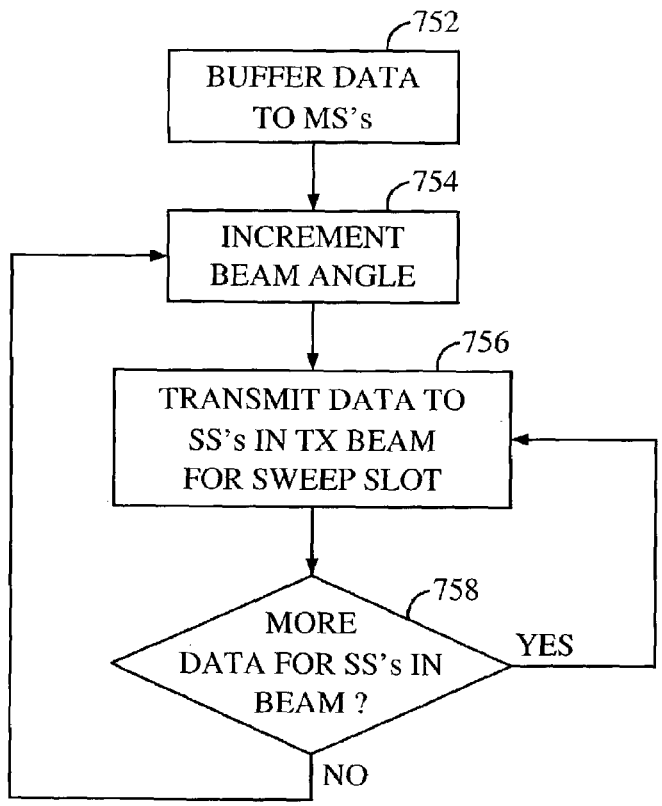
FIG. 7b is a flowchart of a method used to efficiently transmit user data on the forward link from a beam sweeping base station in accordance with an embodiment of the invention.

FIG. 7b is a flowchart of a method used to efficiently transmit user data on the forward link from a beam sweeping base station in accordance with an embodiment of the invention. User data received by a base station and addressed to an active subscriber station is buffered 752. The signal beam angle of each beam sweeping base station is incremented 754 periodically, or continuously over time. For each set of subscriber stations (SS's) located optimally in the current signal beam angle, previously-buffered user data is released for transmission on the forward link 756.

In an exemplary embodiment, the signal beam angle of the serving base station is maintained until all forward link user data is sent to subscriber stations located optimally at that signal beam angle. At appropriate intervals, the amount of user data remaining to be transmitted to those subscriber stations is evaluated 758. As soon as the forward link user data to those subscriber stations is determined to have been exhausted 758, the signal beam angle of the beam sweeping base station is again incremented 754.

Figure 8:
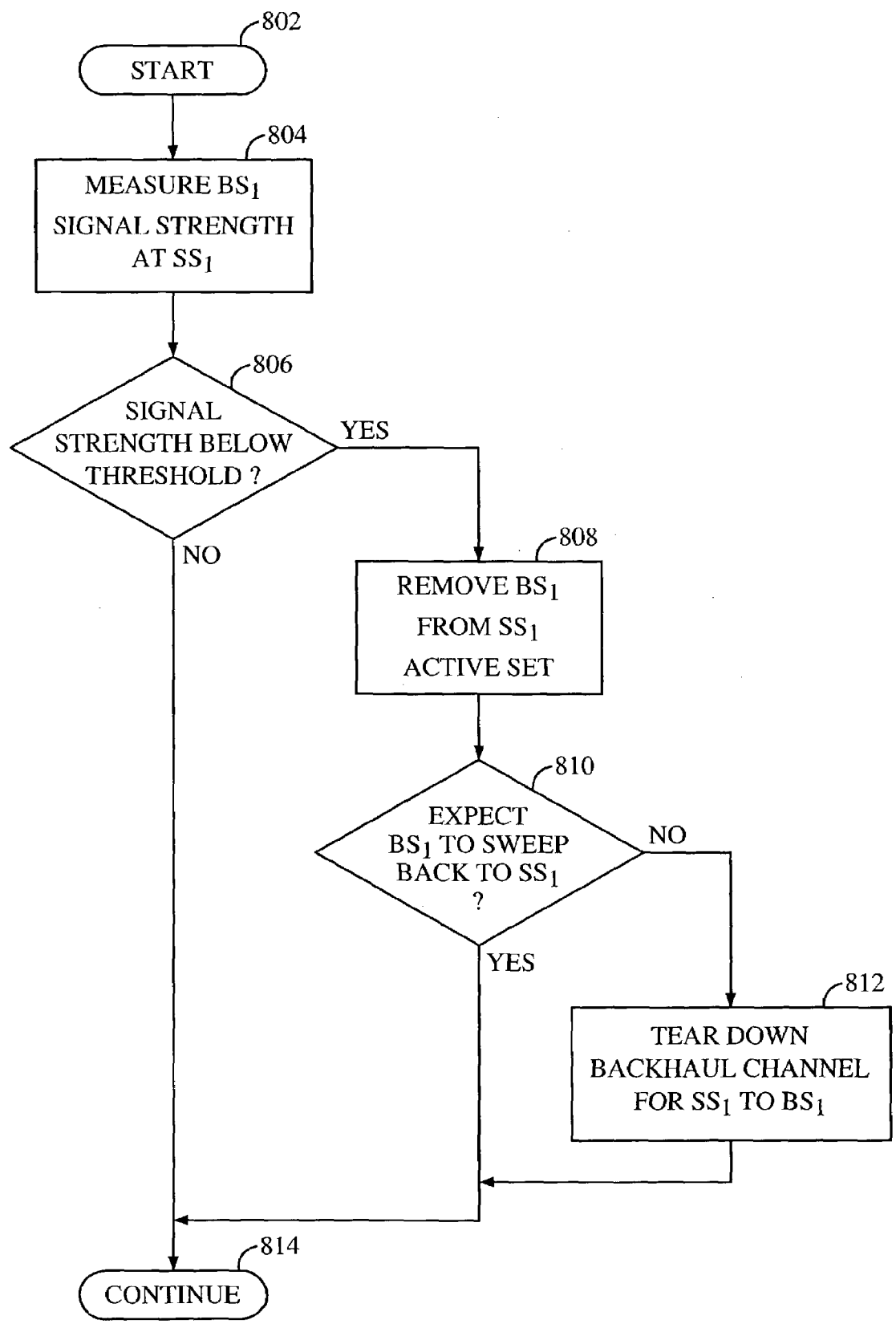
FIG. 8 is a flowchart of a method for determining when to establish, tear down, and maintain backhaul connections in a wireless communication system, in accordance with an embodiment of the present invention.

FIG. 8 is a flowchart of a method used by BSC 114 in determining when to establish, tear down, and maintain backhaul connections to beam sweeping base stations in accordance with an embodiment of the present invention. The flowchart starts 802 with a backhaul connection between a base station 102 and BSC 114 already established to support traffic for a subscriber station 108. Subscriber station 108 periodically measures 804 the strength of the signal received from base station 102 and compares 806 that signal strength to a handoff drop threshold, such as T_DROP. If the signal from base station 102 drops below the handoff drop threshold, the base station 102 is removed 808 from the active set of subscriber station 108.

At this point, rather than tear down the corresponding backhaul connection immediately, a probability is estimated 810 that the same backhaul connection would have to be established again in the near future (within on beam-sweep period). If this probability is low, then the corresponding backhaul connection is torn down 812 and the process begins anew 814. If this probability is high, then the backhaul connection is left intact, even though base station 102 is no longer in subscriber station's 108 active set.

Figure 9:
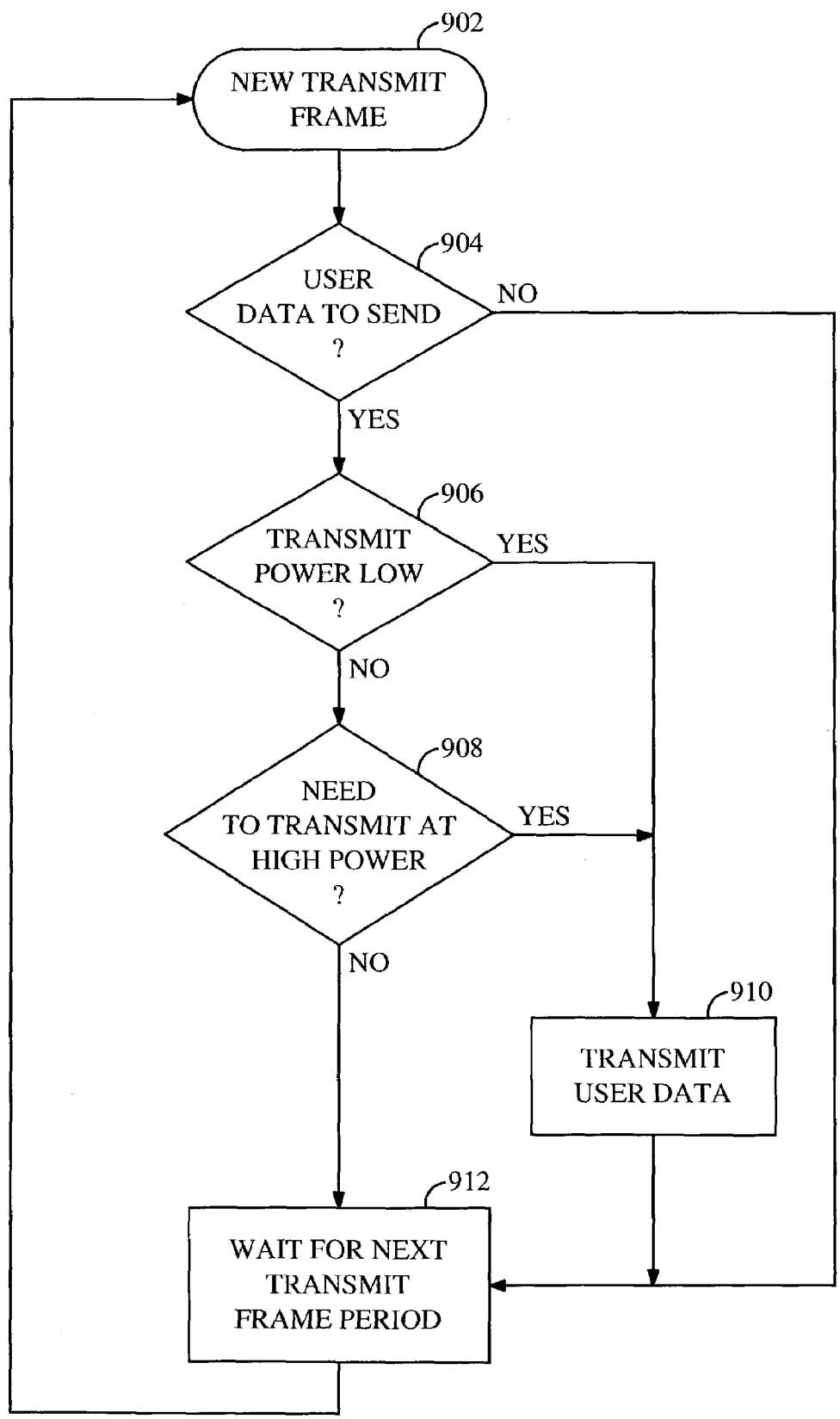
FIG. 9 is a flowchart of a method for determining when to transmit reverse-link user data in accordance with an embodiment of the present invention.

FIG. 9 is a flowchart of a method used by subscriber station 108 in determining when to transmit user data stored in transmit data buffer 604 in accordance with an embodiment of the present invention. As discussed above, subscriber station 108 regulates its reverse-link user data rate such that the user data is transmitted during periods when serving base stations can most efficiently receive the subscriber station's reverse-link signal.

In the preferred embodiment, data is transmitted in a continuous series of frames having fixed time duration. For example, in a conventional IS-95 system, frames are 20 milliseconds in duration and are transmitted beginning on 20-millisecond boundaries. At the beginning of preparation for each frame period 902, subscriber station 108 evaluates the amount of user data in transmit data buffer 604. If the buffer is empty (there is no user data to send), then the subscriber station sends no user data and waits for the next transmit frame period 912.

If there is user data to send, then the efficiency of sending the data immediately on the reverse link is evaluated 906. For example, if the transmit power is below a reverse link power threshold, then the user data is sent immediately 910. For example, the transmit power may be low when the receive signal beam used by a serving beam sweeping base station is at an optimal angle for the subscriber station.

If the transmit power is not below a reverse link power threshold, then the subscriber station evaluates 908 whether user data is being accumulated fast enough to merit transmitting it 910 inefficiently (at high power). If, for example, there is a danger that the user data will overrun the buffer capacity in the subscriber station, then the data will be transmitted 910 immediately.

After transmitting user data 910, processing of user data is complete 912 until the next frame period 902. Although shown as separate steps, steps 904, 906, and 908 may be performed in different orders, or may be combined without departing from the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. A method of identifying a time for transmitting user data on a forward link from a base station to a subscriber station, wherein the base station transmits and receives signals through a base station signal beam having a beam angle that changes over time, the method comprising:
storing the user data in a transmit buffer;
predicting an optimal transmit time from power control commands received from the subscriber station for efficiently transmitting forward-link supplemental channel traffic to the subscriber station based on the beam angle; and
transmitting the user data at the predicted optimal transmit time.

2. The method of claim 1 wherein the predicting comprises correlating a transmit power transmitted by the subscriber station to the beam angle.

3. The method of claim 1 wherein the predicting comprises determining a value of the beam angle at which a target carrier-to-interference ratio can be maintained using minimal transmit power.

4. The method of claim 1 wherein the storing comprises storing the user data in a transmit buffer located in the base station.

5. The method of claim 1 wherein the storing comprises storing the user data in a transmit buffer located in a base station controller.

6. The method of claim 1 further comprising adjusting a rate of change of the beam angle based on the predicting.

7. The method of claim 1 further comprising forming the base station signal beam using at least one mechanically moving directional antenna.

8. The method of claim 1 further comprising forming the base station signal beam using a plurality of spatially separated antennas.

9. A method of identifying a time for transmitting user data on a forward link from a base station to a subscriber station, wherein the base station transmits and receives signals through a base station signal beam having a beam angle that changes over time, the method comprising:
storing the user data in a transmit buffer;
predicting an optimal transmit time for efficiently transmitting forward-link supplemental channel traffic to the subscriber nation based on the beam angle, wherein the predicting comprises comparing a reverse link transmit power to a reverse link power threshold; and
transmitting the user data at the predicted optimal transmit time.

10. A method of identifying a time for transmitting user data on a forward link from a base station to a subscriber station, wherein the base station transmits and receives signals through a base station signal beam having a beam angle that changes over time, the method comprising:

storing the user data in a transmit buffer;

predicting an optimal transmit time for efficiently transmitting forward-link supplemental channel traffic to the subscriber station based on the beam angle, wherein the predicting comprises evaluating a rate at which the user data is being accumulated in the transmit buffer; and transmitting the user data at the predicted optimal transmit time.

11. A method of identifying a time for transmitting user data on a forward link from a base station to a subscriber station, wherein the base station transmits and receives signals through a base station signal beam having a beam angle that changes over time, the method comprising:

storing the user data in a transmit buffer;

predicting an optimal transmit time for efficiently transmitting forward-link supplemental channel traffic to the subscriber station based on the beam angle, wherein the predicting comprises evaluating a rate at which the user data is being accumulated in the transmit buffer; and transmitting the user data at the predicted optimal transmit time.

12. An apparatus comprising:

a buffer configured to store user data and to provide the user data to a channel element module based on a data release signal; and a control processor configured to predict an optimal transmit time from power control commands received from the subscriber station for efficiently transmitting forward-link traffic from a base station to a subscriber station, wherein the base station transmits and receives signals through a base station signal beam having a beam angle that changes over time, wherein the control processor is configured to predict the optimal transmit time based on the beam angle.

13. The apparatus of claim 12 further comprising a backhaul interface configured to transport the user data between the base station and a base station controller.

14. The apparatus of claim 12 further comprising a base station controller, wherein the base station controller comprises the buffer.

15. The apparatus of claim 12 further comprising the base station, wherein the base station comprises the buffer.

16. The apparatus of claim 12 further comprising a beam sweeping controller configured to form the base station signal beam using a plurality of spatially separated antennas.

17. The apparatus of claim 12 further comprising at least one mechanically moving directional antenna configured to form the base station signal beam.

18. The method of claim 12 further comprising a plurality of spatially separated antennas configured to form the base station signal beam.

19. A method of identifying a time for transmitting user data on a reverse link from a subscriber station to a base station, wherein the base station sends and receives signals through a base station beam having a beam angle that changes over time, the method comprising:

storing the user data in a transmit buffer;

determining an efficiency of sending the user data immediately on the reverse link; and identifying the time to transmit the user data based on the efficiency; and transmitting the user data when a reverse link transmit power is below a reverse link power threshold.

20. A method of identifying a time for transmitting user data on a reverse link from a subscriber station to a base station, wherein the base station sends and receives signals through a base station beam having a beam angle that changes over time, the method comprising:

storing the user data in a transmit buffer is;

determining an efficiency of sending the user data immediately on the reverse link, wherein the determining comprises evaluating a rate at which the user data is being accumulated in the transmit buffer, and identifying the time to transmit the user data based on the efficiency.

21. An apparatus comprising:

a transmit data buffer configured to store user data and to provide the user data to a channel element module based on a data release signal;

a control processor configured to predict an optimal transmit time for efficiently transmitting reverse-link traffic from a subscriber station to a base station, wherein the base station transmits and receives signals through a base station signal beam having a beam angle that changes over time, wherein the control processor is configured to predict the optimal transmit time based on the beam angle; and a power control module configured to monitor a frame error rate of forward-link signals received from the base station, wherein the control processor is configured the predict the optimal transmit time based on the frame error race.

22. An apparatus comprising:

a transmit data buffer configured to store user data and to provide the user data to a channel element module based on a data release signal; and a control processor configured to predict an optimal transmit time for efficiently transmitting reverse-link traffic from a subscriber station to a base station, wherein the base station transmits and receives signals through a base station signal beam having a beam angle that changes over time, wherein the control processor is configured to predict the optimal transmit time based on the beam angle; and a power control module configured to monitor a signal-to-noise ratio of forward-link signals received from the base station, wherein the control processor is configured the predict the optimal transmit time based on the signal-to-noise ratio.

23. An apparatus comprising:

a transmit data buffer configured to store user data and to provide the user data to a channel element module based on a data release signal; and a control processor configured to predict an optimal transmit time for efficiently transmitting reverse-link traffic from a subscriber station to a base station, wherein the base station transmits and receives signals through a base station signal beam having a beam angle that changes over time, wherein the control processor is configured to predict the optimal transmit time based on the beam angle; and a power control module configured to regulate a reverse-link power level of the transmitted reverse-link traffic, wherein the control processor is configured to predict the optimal transmit time based on the reverse-link power level.

* * * * *